(12) United States Patent
Neilan

(10) Patent No.: US 11,526,821 B2
(45) Date of Patent: Dec. 13, 2022

(54) MANAGING MEDIA REPLENISHMENT

(71) Applicant: NCR Corporation, Duluth, GA (US)

(72) Inventor: Michael James Neilan, Scotland (GB)

(73) Assignee: NCR Corporation, Atlanta, GA (US)

(*) Notice: Subject to any disclaimer, the term of this patent is extended or adjusted under 35 U.S.C. 154(b) by 567 days.

(21) Appl. No.: 14/013,897

(22) Filed: Aug. 29, 2013

(65) Prior Publication Data
US 2015/0066564 A1    Mar. 5, 2015

(51) Int. Cl.
G06Q 10/06       (2012.01)

(52) U.S. Cl.
CPC .............................. G06Q 10/06315 (2013.01)

(58) Field of Classification Search
None
See application file for complete search history.

(56) References Cited

U.S. PATENT DOCUMENTS

| | | | | |
|---|---|---|---|---|
| 3,833,885 A * | 9/1974 | Gentile | ............... | G07F 19/20 235/379 |
| 6,014,649 A * | 1/2000 | Kobayashi | ............... | G06Q 20/108 705/43 |
| 6,065,672 A * | 5/2000 | Haycock | ............... | G07D 11/0009 235/379 |
| 6,279,826 B1 * | 8/2001 | Gill | ............... | G06Q 20/18 235/379 |
| 6,484,938 B1 * | 11/2002 | Shepherd | ............... | G07F 19/20 235/381 |
| 7,340,415 B1 * | 3/2008 | Gasper | ............... | G06Q 20/1085 705/43 |
| 7,445,144 B2 * | 11/2008 | Schlabach | ............... | G06Q 10/06 235/379 |
| 7,929,749 B1 * | 4/2011 | Jones | ............... | G07D 11/28 382/135 |
| 7,946,474 B1 * | 5/2011 | Agrawal | ............... | G06Q 10/04 235/376 |
| 8,251,281 B1 * | 8/2012 | Eastman | ............... | B65H 7/02 235/379 |
| 8,733,634 B1 * | 5/2014 | Eastman | ............... | G07F 19/20 235/379 |
| 9,367,979 B2 * | 6/2016 | Neilan | ............... | G07D 11/0057 |
| 2002/0099634 A1 * | 7/2002 | Coutts | ............... | G06Q 20/1085 705/35 |

(Continued)

FOREIGN PATENT DOCUMENTS

WO    WO-2004023255 A2 *    3/2004    ........... G07F 19/202

OTHER PUBLICATIONS

Definition of "Top up" at Dictionary.com. Collins English Dictionary—Complete & Unabridged 2012 Digital Edition © William Collins Sons & Co. Ltd. 1979, 1986 © HarperCollins. https://www.dictionary.com/browse/top-up (Year: 2012).*

Primary Examiner — Ayal I. Sharon
(74) Attorney, Agent, or Firm — Schwegman, Lundberg & Woessner

(57) ABSTRACT

A method of managing media replenishment for a media terminal is described. The method comprises: calculating an amount of media required for the media terminal; receiving from the media terminal an indication of media items deposited at that media terminal that have a condition fulfilling a condition criterion; and adjusting the calculated amount of media required based on the indication of media items that fulfill the condition criterion.

9 Claims, 3 Drawing Sheets

(56) References Cited

U.S. PATENT DOCUMENTS

| | | | | |
|---|---|---|---|---|
| 2002/0120572 | A1* | 8/2002 | Bellucci | G06Q 20/10 705/43 |
| 2003/0168849 | A1* | 9/2003 | Reinisch | G07D 7/00 283/72 |
| 2004/0030622 | A1* | 2/2004 | Ramos | G06Q 10/08 705/35 |
| 2004/0083149 | A1* | 4/2004 | Jones | G06Q 40/00 705/35 |
| 2004/0158539 | A1* | 8/2004 | Akita | G06Q 10/06 705/400 |
| 2004/0205024 | A1* | 10/2004 | Washington | G06Q 20/1085 705/43 |
| 2004/0215566 | A1* | 10/2004 | Meurer | G06Q 10/10 705/43 |
| 2004/0217162 | A1* | 11/2004 | Chigira | G06Q 10/08 235/379 |
| 2004/0222283 | A1* | 11/2004 | Mastie | G06Q 20/40 235/379 |
| 2004/0232217 | A1* | 11/2004 | Graef | B65H 29/06 235/379 |
| 2004/0256450 | A1* | 12/2004 | Fujioka | G06Q 20/18 235/379 |
| 2005/0029168 | A1* | 2/2005 | Jones | B65H 15/00 209/534 |
| 2005/0056693 | A1* | 3/2005 | Yokoi | G07F 19/20 235/379 |
| 2005/0096986 | A1* | 5/2005 | Taylor | G06Q 40/02 705/16 |
| 2005/0183928 | A1* | 8/2005 | Jones | B65H 15/00 194/207 |
| 2005/0207634 | A1* | 9/2005 | Jones | G06Q 20/18 382/135 |
| 2006/0065717 | A1* | 3/2006 | Hurwitz | G06Q 20/02 235/381 |
| 2006/0106716 | A1* | 5/2006 | Hurwitz | G06Q 30/00 705/40 |
| 2006/0129484 | A1* | 6/2006 | Hurwitz | G06Q 20/102 705/40 |
| 2006/0146839 | A1* | 7/2006 | Hurwitz | G06Q 20/06 370/401 |
| 2007/0122023 | A1* | 5/2007 | Jenrick | G07D 7/187 382/135 |
| 2007/0136125 | A1* | 6/2007 | Godwin | G06Q 10/06 705/7.22 |
| 2007/0278138 | A1* | 12/2007 | Calverley | B65H 1/06 209/534 |
| 2008/0116254 | A1* | 5/2008 | Sleeman | G07F 19/211 235/375 |
| 2008/0126106 | A1* | 5/2008 | He | G06Q 20/042 235/379 |
| 2009/0199050 | A1* | 8/2009 | Neilan | G07F 9/026 714/57 |
| 2009/0199053 | A1* | 8/2009 | Neilan | G07F 9/026 714/57 |
| 2009/0285470 | A1* | 11/2009 | Takai | G07D 7/17 382/135 |
| 2009/0299800 | A1* | 12/2009 | Neilan | G06Q 10/06 705/7.26 |
| 2010/0082355 | A1* | 4/2010 | Folk | G07D 11/245 705/1.1 |
| 2010/0082443 | A1* | 4/2010 | Folk | G06Q 20/10 705/16 |
| 2010/0082483 | A1* | 4/2010 | Sanders | G06Q 10/087 705/42 |
| 2010/0131407 | A1* | 5/2010 | Folk | G06Q 20/10 705/39 |
| 2010/0174402 | A1* | 7/2010 | Hattori | G07D 11/0006 700/215 |
| 2011/0170761 | A1* | 7/2011 | Fu | G07D 7/0047 382/135 |
| 2011/0172808 | A1* | 7/2011 | Fu | G07D 11/0066 700/215 |
| 2011/0206265 | A1* | 8/2011 | Numata | G06Q 20/389 382/135 |
| 2011/0255767 | A1* | 10/2011 | Jenrick | G07D 7/162 382/135 |
| 2011/0320296 | A1* | 12/2011 | Edwards | G06Q 20/208 705/23 |
| 2012/0243056 | A1* | 9/2012 | Yamaguchi | G06K 9/03 358/462 |
| 2012/0279173 | A1* | 11/2012 | Sakoguchi | G07D 11/40 53/399 |
| 2013/0238498 | A1* | 9/2013 | Forsyth | G06Q 20/18 705/43 |
| 2014/0069769 | A1* | 3/2014 | Kobayashi | G07D 11/00 194/206 |
| 2014/0158496 | A1* | 6/2014 | Angus | G07D 7/12 194/302 |
| 2015/0046933 | A1* | 2/2015 | Neilan | G06F 9/542 719/318 |
| 2015/0051731 | A1* | 2/2015 | Neilan | G07D 11/245 700/244 |
| 2015/0057795 | A1* | 2/2015 | Kubo | G07D 11/0081 700/224 |
| 2015/0066564 | A1* | 3/2015 | Neilan | G06Q 10/06315 705/7.25 |
| 2015/0178664 | A1* | 6/2015 | Neilan | G06Q 10/063114 705/7.15 |
| 2015/0178670 | A1* | 6/2015 | Angus | G06Q 10/087 705/28 |
| 2015/0180728 | A1* | 6/2015 | Forrest | G07F 19/209 709/207 |
| 2015/0325072 | A1* | 11/2015 | Nakai | G06Q 40/02 194/302 |
| 2016/0093132 | A1* | 3/2016 | Asada | B65H 26/00 270/52.04 |
| 2017/0039819 | A1* | 2/2017 | Angus | G06Q 10/087 |
| 2017/0039820 | A1* | 2/2017 | Angus | G06Q 10/087 |

* cited by examiner

MANAGING MEDIA REPLENISHMENT

FIELD OF INVENTION

The present invention relates to managing media replenishment. In particular, although not exclusively, the invention relates to managing replenishment of media (such as banknotes) at a media terminal (such as an automated teller machine (ATM)).

BACKGROUND OF INVENTION

ATMs need periodic replenishment so that they can continue to dispense cash to customers. Owners of large ATM networks typically use cash optimization techniques to ensure that the cash distributed throughout a bank's network (which includes the bank's ATMs) is optimally located to maintain availability of cash and to minimize cash replenishment operations, without requiring large amounts of surplus cash (which is expensive) to be located within the network.

Cash has a lifecycle. A banknote's physical condition deteriorates over time, and at a certain level of deterioration the banknote must be removed from the cash cycle and returned to a banknote issuing authority for destruction.

It would be advantageous to be able to factor in the number of banknotes needing removed from a network when calculating the number of banknotes needed to replenish the media terminals in that network.

It would also be advantageous if a currency vault was able to reduce the float of currency that it stored because it had accurate information about the amount of currency within a network that can be reused and the amount of currency within a network that is unfit for re-circulation.

SUMMARY OF INVENTION

Accordingly, the invention generally provides methods, systems, and software for managing media replenishment.

In addition to the Summary of Invention provided above and the subject matter disclosed below in the Detailed Description, the following paragraphs of this section are intended to provide further basis for alternative claim language for possible use during prosecution of this application, if required. If this application is granted, some aspects may relate to claims added during prosecution of this application, other aspects may relate to claims deleted during prosecution, other aspects may relate to subject matter never claimed. Furthermore, the various aspects detailed hereinafter are independent of each other, except where stated otherwise. Any claim corresponding to one aspect should not be construed as incorporating any element or feature of the other aspects unless explicitly stated in that claim.

According to a first aspect there is provided a method of managing media replenishment for a media terminal, the method comprising: calculating an amount of media required for the media terminal; receiving from the media terminal an indication of media items deposited at that media terminal that have a condition fulfilling a condition criterion; and adjusting the calculated amount of media required based on the indication of media items that fulfill the condition criterion.

The step of receiving from the media terminal an indication of media items may comprise receiving a total amount (for example, a dollar value) of media items of the same type. Where the media items comprise currency, a type may be a denomination of that currency.

Alternatively, or additionally, the step of receiving from the media terminal an indication of media items may comprise receiving a total number of media items of the same type. Where the media items comprise currency, a type may be a denomination of that currency.

The condition criterion may comprise the media item having a satisfactory condition, such as at least a defined minimum physical condition. Alternatively, the condition criterion may comprise the media item having an unsatisfactory condition, such as not fulfilling at least a defined minimum physical condition.

The step of adjusting the calculated amount of media required based on the indication of media items that fulfill the condition criterion may comprise subtracting the indication of media items from the calculated amount of media where the media items have a satisfactory condition.

The method may comprise the further step of: receiving an indication of undispensed media remaining in the media terminal.

The indication of undispensed media may be received from the media terminal, either directly or indirectly. Indirect receipt may be from a remote server monitoring the media terminal and recording an initial count of media items and all subsequent dispense transactions.

The method may comprise the further step of: deducting the indication of undispensed media remaining in the media terminal from the calculated amount of media required. This may be advantageous where undispensed media can remain at the media terminal. This step may not be used if partially full media cassettes are removed from the media terminal during a replenishment operation.

The method may comprise the further step of: deducting an amount greater than the indication of undispensed media remaining in the media terminal from the calculated amount of media required to compensate for media that may be dispensed prior to a media replenishment operation being fulfilled. The amount may be a fixed amount, a percentage of the undispensed media, an amount based on the average number of (and/or amount deducted in) dispense transactions, or any other convenient amount.

According to a second aspect there is provided a method of transmitting media condition information from a media terminal, the method comprising: (i) communicating with a media validator to receive information about: (a) media items deposited at that media terminal that have a condition fulfilling a rejection criterion, and (b) media items deposited at that media terminal that have a condition fulfilling an acceptance criterion; and (ii) transmitting the received information to a remote management application.

The method may be implemented by a management agent executing on the media terminal.

The management agent may be a distributed management agent comprising an agent core, a plurality of collector agents, and a transfer agent. A collector agent may be associated with the media validator.

The management agent may communicate with the media validator either (a) in response to a request for information from the remote management application, (b) as a result of a schedule of information prescribed for a collector agent associated with that media validator, (c) or in any other convenient manner.

The management agent may communicate with the media validator by communicating with software associated with the media validator.

According to a third aspect there is provided a media terminal comprising (i) a media depository including a media validator, (ii) a management agent operable to: (a) communicate with the media validator to receive information about (x) media items deposited at that media terminal that have a condition fulfilling a rejection criterion, and (y) media items deposited at that media terminal that have a condition fulfilling an acceptance criterion; and (b) transmit the received information to a remote management application.

The media depository may comprise a media deposit only device or a media recycler device (that is, a device that can dispense media deposited by a previous customer).

The management agent may comprise: an agent core, a plurality of collector components, and a transfer service.

The agent core may comprise: an agent configuration component; a rules engine component; a scheduling component; and an event filtering component.

A collector component may be associated with the media validator.

The transfer service component may be used to facilitate communications between the remote management application and the agent core.

The transfer service component may implement a known communications technology. For example, the transfer service may implement simple network management protocol (SNMP), Web services, a Background Intelligent Transfer Service (BITS), or the like.

The media terminal may comprise an automated teller machine, a self-checkout terminal, a payment terminal, or the like.

The management agent may be an enhanced version of the Unified Agent available from NCR Corporation.

The remote management application may implement a media optimization function to decide how much media should be located at the media terminal.

The remote management application may also implement a media terminal management function so that the remote management application receives event and fault information from the media terminal, and may dispatch a service engineer to service the media terminal.

The remote management application may be located in a currency vault, a financial institution back-office, a remote help call-center, or in any other convenient location.

The media terminal may comprise a self-service terminal or an assisted service terminal. The self-service terminal may comprise an automated teller machine, and the media may comprise cash (such as banknotes or coins).

According to a fourth aspect there is provided a management agent for executing on a terminal comprising a media deposit device, wherein the management agent is programmed to: (i) receive an indication of media items that are not of satisfactory quality for continued circulation; and (ii) provide the indication to a remote management application.

According to a fifth aspect there is provided a method of managing media replenishment for a media terminal, the method comprising: receiving an indication from the media terminal of media items deposited at that media terminal that have a condition fulfilling a rejection criterion; receiving an indication from the media terminal of media items deposited at that media terminal that have a condition fulfilling an acceptance criterion; and subtracting the media items fulfilling the acceptance criterion from a total amount of media items required to calculate a replenishment amount for that media terminal.

The media terminal may comprise a self-service terminal, an assisted service terminal, or the like. The self-service terminal may comprise an automated teller machine, and the media may comprise cash (such as banknotes or coins).

The method may be implemented by a remote (from the media terminal) management application implementing a media optimization function to decide how much media should be located at the media terminal.

The remote management application may also implement a media terminal management function so that the remote management application receives event and fault information from the media terminal, and may dispatch a service engineer to service (including preventative maintenance and repair) the media terminal.

The indication from the media terminal of media items deposited at that media terminal that have a condition fulfilling a rejection criterion may comprise a total of media items of a particular denomination and/or the number of media items of a particular denomination.

Similarly, the indication from the media terminal of media items deposited at that media terminal that have a condition fulfilling an acceptance criterion may comprise a total of media items of a particular denomination and/or the number of media items of a particular denomination.

According to a sixth aspect there is provided a method of managing an amount of media at a media center for servicing a media network, the method comprising: calculating an amount of media required for the media network; receiving from a media terminal in the media network an indication of media items deposited at that media terminal that have a condition fulfilling a condition criterion; and adjusting the calculated amount of media required based on the indication of media items that fulfill the condition criterion.

The media network may comprise a plurality of media terminals, each media terminal being operable to provide the media center with an indication of media items deposited at that media terminal that have a condition fulfilling the condition criterion.

The media center may comprise a currency vault, and the media may comprise currency.

By virtue of this aspect, the media center can reduce the amount of media it stores based on knowing how much media is in the media terminal that can be reused in other media terminals.

For clarity and simplicity of description, not all combinations of elements provided in the aspects recited above have been set forth expressly. Notwithstanding this, the skilled person will directly and unambiguously recognize that unless it is not technically possible, or it is explicitly stated to the contrary, the consistory clauses referring to one aspect are intended to apply mutatis mutandis as optional features of every other aspect to which those consistory clauses could possibly relate.

These and other aspects will be apparent from the following specific description, given by way of example, with reference to the accompanying drawings.

DETAILED DESCRIPTION

Figure 1:
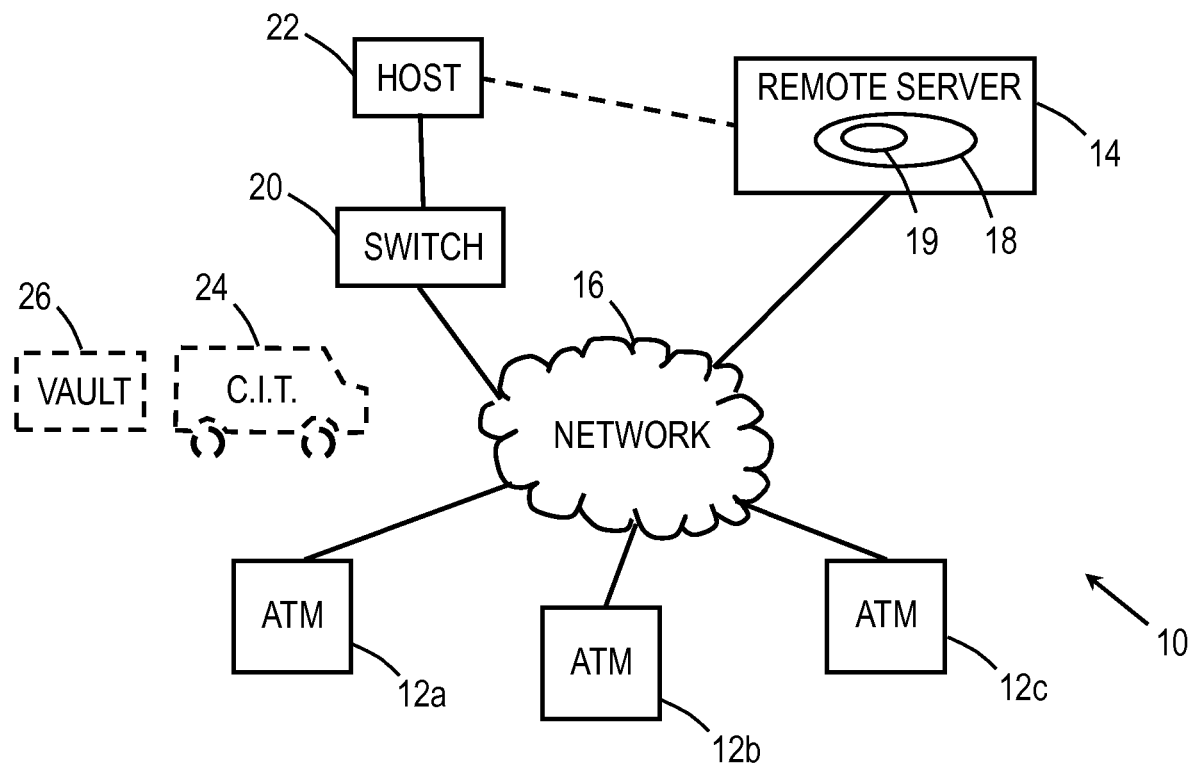
FIG. 1 is a simplified block diagram illustrating a system for managing media replenishment according to one embodiment of the present invention.

Reference is first made to FIG. 1, which is a block diagram illustrating a system 10 for managing media replenishment (in particular cash replenishment) according to one embodiment of the present invention.

The system 10 comprises a plurality of media terminals 12 (only three of which are illustrated in FIG. 1) in the form of automated teller machines (ATMs) coupled to a remote management server 14 by an Internet Protocol (IP) network 16. A management application 18 executes on the remote management server 14 and is used to monitor the status and performance of the ATMs 12 in the system 10, and to schedule maintenance and replenishment operations for these ATMs 12.

The management application 18 also includes cash optimization software 19. In this embodiment the cash optimization software 19 is NCR APTRA OptiCash (trademark), available from NCR Corporation.

NCR APTRA OptiCash software 19 provides an advanced cash management solution that predicts the demand for currency at each media terminal (or other cash point), such as the ATMs 12, on an individual basis. By applying sophisticated mathematical algorithms to historical, event and cost data, the optimum cash position and delivery schedule for each cash point (or each currency cassette or cash drawer within a cash point) is determined.

The system 10 also comprises a conventional transaction switch 20 and an authorization server 22 (also referred to as a transaction host or an authorization host). As is known in the art, the transaction switch 20 is used to route transactions requested by a customer at one of the ATMs 12 to a financial institution that maintains an account for that customer. For any transactions requested by customers of the owner of the system 10 (referred to as "on-us" transactions), the authorization server 22 provides the authorization approval or denial. For other transactions ("not-on-us" transactions) the transaction switch 20 routes the transaction request to an appropriate interchange network (not shown) for approval, as is known to those of skill in the art.

The authorization server 22 also stores account information for all of the customers of the financial institution that owns or operates the system 10, and also stores information about each ATM 12 (such as the cash totals, total amount dispensed since last replenishment, and the like). In this embodiment, the transaction switch 20 and the authorization server 22 are conventional, unmodified, devices similar to those currently used in conventional ATM networks.

A media replenisher 24, in the form of a cash-in-transit (or CIT) person, is illustrated in a vehicle that conveys currency from a currency vault 26 to the ATMs 12 according to a defined schedule or in response to the ATM 12 running low or out of cash. The media replenisher 24 and the currency vault 26 are not part of the system 10 but provide replenishment services thereto. The currency vault 26 may provide cash to multiple systems 10 (for example, different ATM networks operated by different financial institutions).

Figure 2:
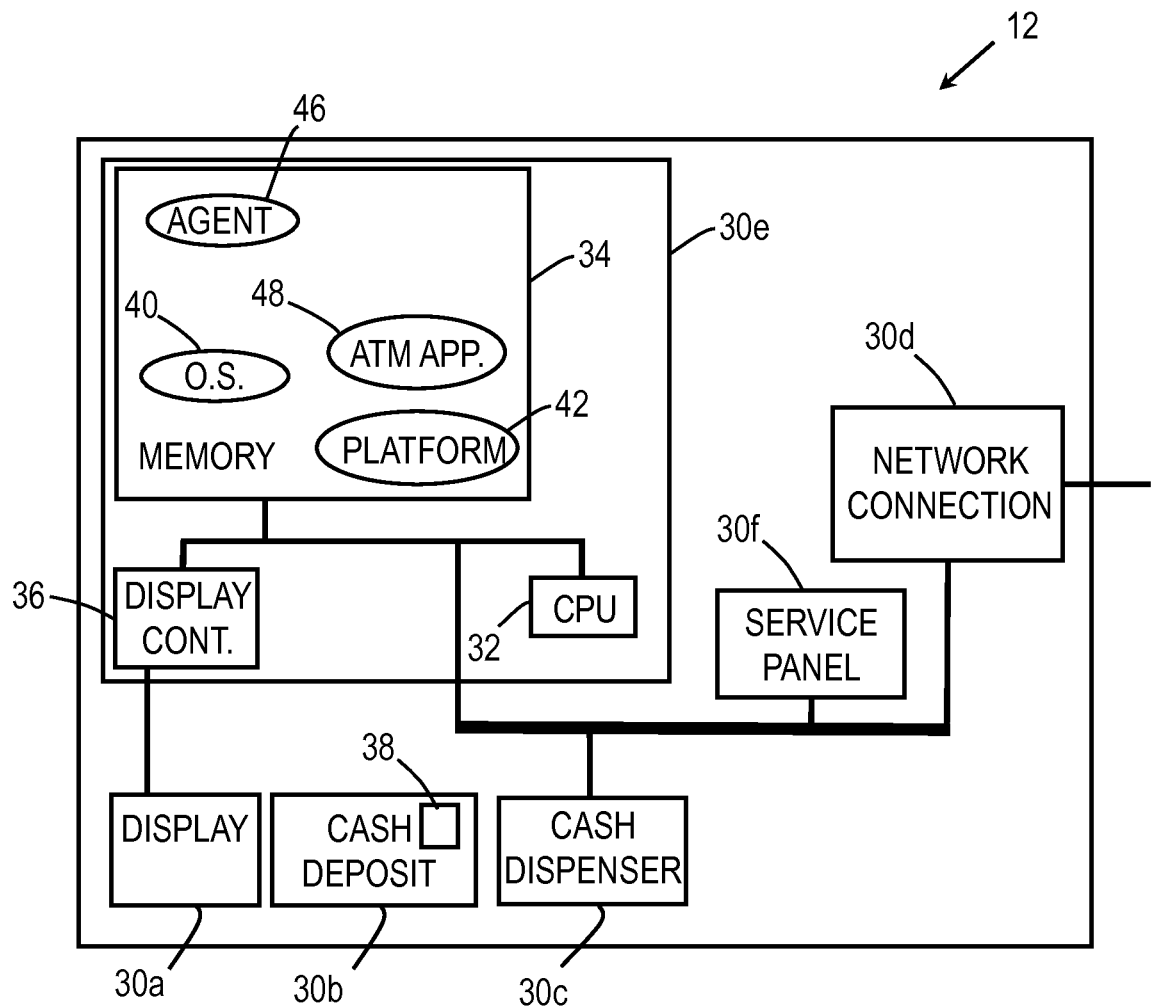
FIG. 2 is a simplified block diagram illustrating one of the media terminals (one of the ATMs) of the system of FIG. 1 in more detail.

Reference is now also made to FIG. 2, which is a simplified block diagram illustrating one of the ATMs 12 of FIG. 1 in more detail.

Each ATM 12 includes a plurality of managed devices 30, only some of which are shown in FIG. 2. As used herein, the term "managed device" has a broad meaning that encompasses software components, hardware components, and combined software and hardware components.

The managed devices include: a customer display 30a, a cash deposit device 30b, a cash dispenser device 30c; a network device 30d for connecting to the IP network 16; a controller device 30e (in the form of a PC core) for controlling the operation of the ATM 12, including the operation of other managed devices (not shown for simplicity of description), and various other managed devices 30 that are conventional in ATMs but not required for an understanding of this embodiment.

The controller 30e comprises a microprocessor (CPU) 32, associated main memory 34, and a display controller 36 in the form of a graphics card that controls the customer display 30a.

The cash deposit device 30b includes a banknote validator 38 for recognizing deposited banknotes and ascertaining if those deposited banknotes are valid. The banknote validator 38 also ascertains the physical condition of each banknote inserted into the cash deposit device 30b. Suitable cash deposit devices are available from NCR Corporation.

During operation of the ATM 12, various software components are loaded into, and execute in, the memory 34. These components include a conventional operating system 40 (in this embodiment a Microsoft (trade mark) Windows 7 (trade mark) operating system), platform components 42 for enhancing and extending the operating system for non-standard devices (such as the cash dispenser 30c and the like), a distributed management agent 46, and an ATM transaction application 48.

In this embodiment, the ATM 12 implements the CEN XFS standard. As is known in the art, CEN is the European Committee for Standardization, and XFS is the eXtensions for Financial Services standard. This standard allows software developed by one vendor to operate on an ATM that includes hardware provided by a different vendor because standardized commands are issued by the software and executed by the hardware.

To implement the XFS standard, the platform components 42 include an XFS manager (not shown) and various XFS service providers (not shown in FIG. 2). However, in this embodiment, the management application 18 requires information that is not provided by the standard set of XFS commands (that is, the information is not available via XFS service providers). To provide that information, the platform components 42 include enhanced drivers (not shown) for some of the managed devices 30 (in particular, the cash deposit device 30b). Thus, the platform components 42 include a featurised driver (not shown) for the cash deposit device 30b that logs, inter alia, information about the condition of each banknote that is deposited into the cash deposit device 30b. The information logged by the featurised driver is exposed via a defined interface.

Figure 3:
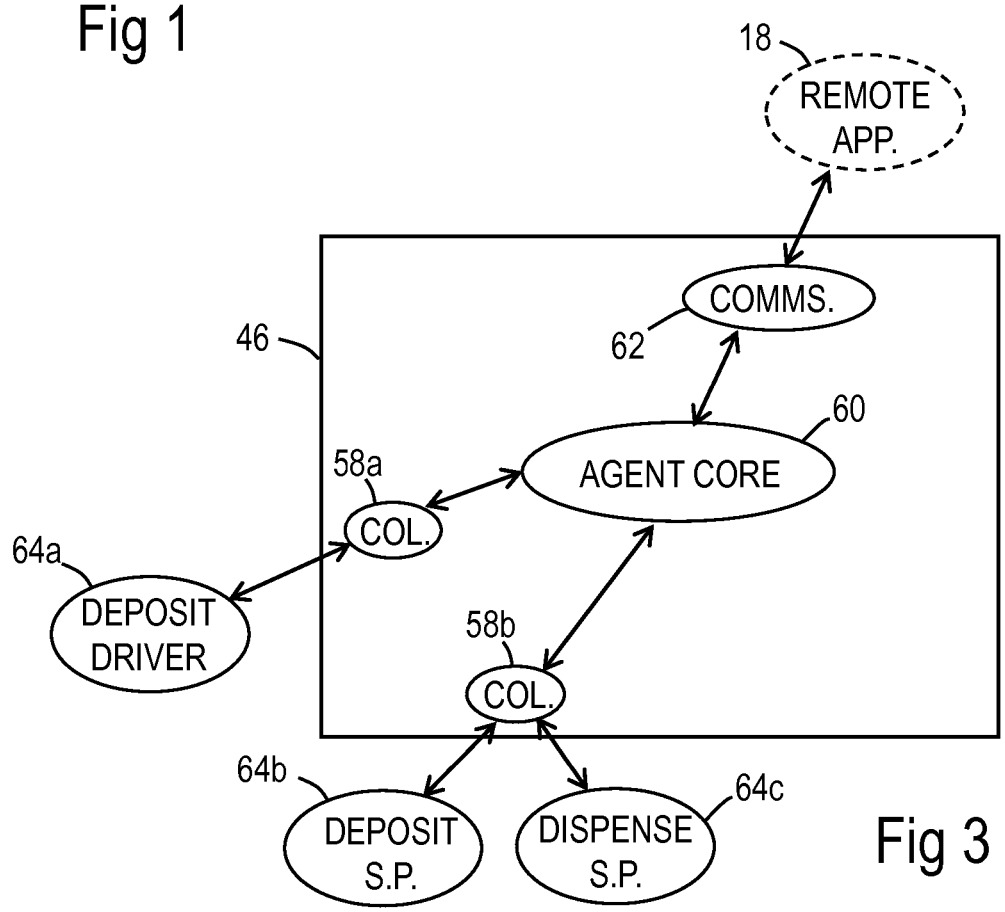
FIG. 3 is a simplified block diagram illustrating software components in the ATM of FIG. 2.

Reference is now also made to FIG. 3, which is a simplified block diagram illustrating in more detail some of the software components executing on the ATM 12, including the management agent 46.

The management agent 46 includes various collector components 58 (only two of which are shown). The management agent 46 also comprises an agent core 60 that communicates with all of the collector components 58, and a transfer service component 62 that manages communication between the agent core 60 and the management application 18 (shown in broken line in FIG. 3 because it does not execute on the ATM 12).

Each collector component 58 is associated with at least one (but in some cases multiple) managed device(s). One of the collector components 58*a* (a banknote validator collector component) is associated with a featurised driver 64*a* for the cash deposit device 30*b*. Another collector component (the XFS collector component) 58*b* is associated with an XFS manager (as will be explained in more detail below). Various other collector components are also present but are not illustrated in FIG. 3.

The XFS collector component 58*b* communicates with the XFS service providers associated with the relevant managed devices. Thus, as shown in FIG. 3, the XFS collector component 58*b* communicates with a deposit XFS service provider 64*b* and a dispense XFS service provider 64*c*. In this embodiments, this is implemented by the XFS collector component 58*b* opening a session with each of these service providers 64*b,c*. This enables the XFS collector component 58*b* to gather information from the relevant service providers, either by sending a request when the information is needed, or by sending requests according to a defined schedule (typically stored by the agent core 60).

Figure 4:
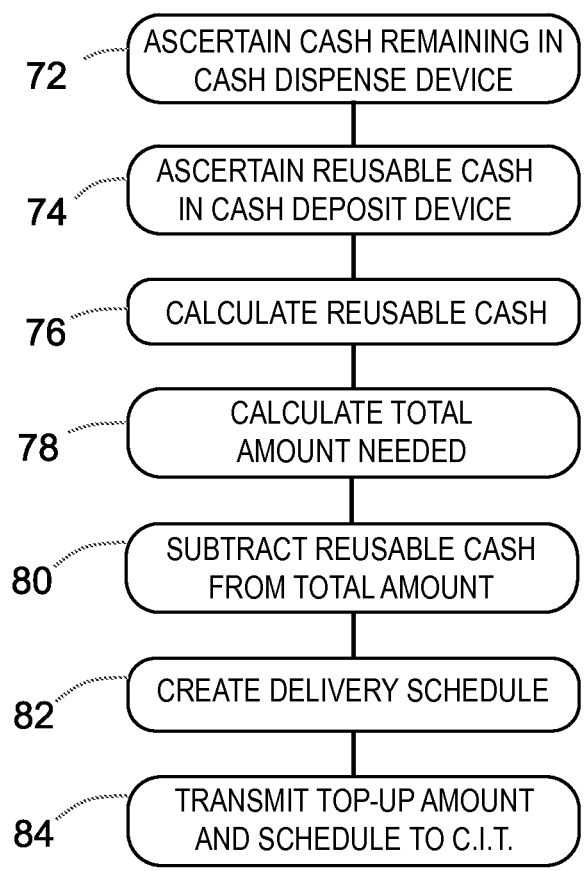
FIG. 4 is a flowchart illustrating steps performed by a part (a management application) of the system of FIG. 1 in calculating and scheduling cash replenishment for the ATM of FIG. 2 using information provided by the ATM of FIG. 2.

The banknote validator collector component 58*a* opens a session with the cash deposit device driver 64*a* to obtain information that is not available via a defined command in the CEN XFS standard. In particular, in this embodiment, the banknote validator collector component 58*a* obtains from the cash deposit device driver 64*a* information about the condition of each banknote deposited in the banknote validator 38. Reference will now also be made to FIG. 4, which is a flowchart 70 illustrating steps performed by the management application 18 in calculating and scheduling cash replenishment for the ATMs 12 in the system 10, where the cash replenishment is based on topping up the ATM currency cassettes rather than replacing partially full cassettes with full cassettes.

The first step (step 72) is for the remote management application 18 to ascertain the current cash total in the cash dispenser device (or devices) 30*c* in each ATM 12. This is performed for all of the ATMs 12 in the system 10, but is only described for one ATM 12 for simplicity of description and ease of understanding.

The remote management application 18 may ascertain the amount of cash remaining in the cash dispenser device 30*c* in one or more of a plurality of different ways. For example, the remote management application 18 may ascertain the amount of cash by sending a query to the management agent 46, by sending a query to the authorization server 22, it may store the amount locally and update the amount after each transaction, or it may ascertain the amount of cash in ATM 12 in any other convenient manner.

The next step is for the remote management application 18 to ascertain the amount of reusable cash in the cash deposit device 30*b* in each ATM 12 (step 74). The amount of reusable cash in the cash deposit device 30*b* is always either equal to or less than the amount of cash in the cash deposit device 30*b* because some of the cash may not be in a satisfactory physical condition for reuse.

The cash deposit device 30*b* automatically assesses the physical condition of each banknote received and may segregate banknotes not having a satisfactory condition (that is, not fulfilling a condition criterion) by storing those banknotes in a separate compartment (not shown) within the cash deposit device 30*b*. However, in embodiments where there is insufficient storage locations, the unfit banknotes may not be segregated.

The cash deposit device driver 64*a* logs those banknotes that do not fulfill the condition criterion by maintaining a record of the denomination and number of these banknotes (those not having a satisfactory condition).

In this embodiment, the remote management application 18 ascertains the amount of reusable cash in each cash deposit device 30*b* by sending a request to the management agent 46 for that ATM 12.

This request is handled by the management agent 46 as follows. The transfer service 62 receives this request and conveys it to the agent core 60. The agent core 60 conveys this request to the relevant collector component (in this case, the banknote validator collector component 58*a*), which retrieves the requested information from the featurised driver 64*a* for the cash deposit device 30*b*. The information retrieved comprises the banknotes deposited into the cash depository (total number for each denomination), and the banknotes (total number for each denomination) that are not reusable because they do not satisfy the condition criterion.

Once the remote application 18 has ascertained the amount of reusable cash in the cash deposit device 30*b*, the remote application 18 then adds the amount of reusable cash in the cash deposit device 30*b* to the remaining cash in the cash dispense device 30*c* to create a total amount of reusable cash in the ATM 12 (step 76).

The next step is for the remote management application 18 to use the cash optimization software 19 to predict how much cash is needed at the ATM 12 (step 78) (that is, the total amount of cash needed). The total amount of cash needed may comprise a total for each currency cassette in the ATM 12 and/or a total for each denomination provided. It will be apparent to the skilled person that step 78 could be performed prior to establishing how many usable banknotes remain in ATM 12.

The remote application 18 then subtracts the total amount of reusable cash from the total amount of cash needed (step 80). The result is the amount of additional cash needed at the ATM 12 (also called the top-up amount needed).

The next step is for the remote management application 18 to use the cash optimization software 19 to predict when the top-up amount of cash should be delivered to the ATM 12 (that is, a delivery schedule is created) (step 82). The delivery schedule may depend on how much cash remains in the other ATMs 12, when those other ATMs 12 will need replenished, what other devices (for example, tellers) in the same geographic area need replenishment, and the like.

The remote management application 18 then transmits an indication of the top-up amount of cash required and the delivery schedule to a CIT 24 (FIG. 1) (step 84) as a cash order. The CIT 24 will then fulfill the cash order by taking the required amount of cash (that is, the top-up amount) from the currency vault 26 and delivering that cash to the ATM 12. The CIT 24 will reuse the cash remaining in the ATM 12 (from both the cash deposit device 30*b* and the cash dispense device 30*c*), and remove any banknotes that do not meet the condition criterion (which may have been segregated within the cash deposit device 30*b*) for return to the currency issuing authority.

It should now be appreciated that this embodiment has the advantage of reducing the amount of cash that has to be delivered to an ATM (or other media terminal) by reducing the required amount by the amount of reusable banknotes located within the ATM. By knowing in advance how much currency can be reused, the amount of currency delivered can be reduced.

In some embodiments, any currency that is located within an ATM (in one or more currency cassettes) may be removed and replaced with new currency (that is, replacement currency cassettes may be racked into an ATM once the existing currency cassettes are removed). In such embodiments, the currency removed from an ATM is not reused in that ATM (or at least not immediately reused). Even in such embodiments, the ability to ascertain what banknotes are suitable for reuse enables the currency vault 26 (or other currency provider) to reduce the amount of float (that is, how much currency the vault stores to meet the demands of the currency network) because the currency vault 26 is informed (for example, by the management application 19) of how much currency can be reused and how much needs to be removed from circulation. By reducing the amount of float stored by the amount of currency that is reusable, significant savings may be made by the currency vault 26.

Various modifications may be made to the above described embodiment within the scope of the invention, for example, in other embodiments, media terminals other than ATMs, or networks other than SSTs (for example, point of sale (PoS) terminal networks, assisted service terminal networks, mixed PoS, assisted service, and ATM networks, or the like), may be used to implement the media replenishment function.

In other embodiments, the management application 18 may execute on the authorization server 22, or in the currency vault 26, instead of on the remote management server 14 (there may be no remote management server 14).

In other embodiments, the remote management application 18 may ascertain the amount of reusable cash in each ATM 12 by receiving a scheduled report from the associated collectors 64b, 64c for the cash deposit device 30b and the cash dispense device 30c, or in any other convenient manner.

In other embodiments, the amount of top-up cash may be increased to take account of any cash that may be withdrawn from the ATM 12 in the period between when the amount of cash needed is calculated and when the top-up cash will be delivered.

In other embodiments, a network other than an IP network (such as an SNA network) may be used.

The steps of the methods described herein may be carried out in any suitable order, or simultaneously where appropriate. The methods described herein may be performed by software in machine readable form on a tangible storage medium or as a propagating signal.

The terms "comprising", "including", "incorporating", and "having" are used herein to recite an open-ended list of one or more elements or steps, not a closed list. When such terms are used, those elements or steps recited in the list are not exclusive of other elements or steps that may be added to the list.

Unless otherwise indicated by the context, the terms "a" and "an" are used herein to denote at least one of the elements, integers, steps, features, operations, or components mentioned thereafter, but do not exclude additional elements, integers, steps, features, operations, or components.

The presence of broadening words and phrases such as "one or more," "at least," "but not limited to" or other similar phrases in some instances does not mean, and should not be construed as meaning, that the narrower case is intended or required in instances where such broadening phrases are not used.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method of managing media replenishment for a media terminal, the method comprising:
   providing executable instructions to a hardware processor of a remote server from a non-transitory computer-readable storage medium causing the hardware processor to perform operations comprising:
   calculating an amount of media required for the media terminal by processing a cash management algorithm that utilizes historical media usage for the media terminal, event data for the media terminal, and cost data for the media terminal to provide the amount of media required for the terminal including media cassette amounts needed for each media denomination in each media cassette of the media terminal and the cash management algorithm provides a delivery schedule for expected replenishment of the media terminal with the amount of media required, wherein the remote server is remote from the media terminal over a network;
   receiving from a distributed management agent of the media terminal that is an Automated Teller Machine (ATM) an indication of media items present, and deposited within the media terminal, that have a condition fulfilling a condition criterion;
   adjusting the amount of media required based on the indication of media items that fulfill the condition criterion, wherein adjusting further includes:
   instructing a media dispenser integrated into and part of the ATM to 1) add the media items that fulfill the condition for the condition criterion with undispensed media items, 2) produce a total amount of reusable media items within the media terminal, and 3) determine a total usable amount for the media items within the media dispenser and a total unusable amount comprising media items that are unfit for recirculation by sending a message to the distributed management agent to interact and cause the media dispenser to perform 1)-3);
   sending a request to the distributed management agent of the media terminal for the total usable amount;
   receiving the total unusable amount of media comprising an unusable total per denomination of the media from the distributed management agent of the media terminal; and
   receiving a total deposited amount of media comprising a deposited total per denomination of the media from the distributed management agent of the media terminal;
   predicting a top-up media amount for the ATM as the total amount of reusable media subtracted from the amount of media required, and determining when replenishment of additional media items should be delivered to the media terminal by modifying the delivery schedule, wherein modifying further includes modifying the delivery schedule based in part on remaining media at other ATMs and any other devices requiring media in a same geographic area of the ATM where replenishment is needed;

increasing the top-up media amount by adjusting for any dispensed media occurring at the ATM during a period of time from when the predicting completed and when the top-up media is to be delivered to the ATM; and sending a replenishment indication to a Cash-In-Transit (CIT) person for delivering the additional media items in the top-up media amount based on the delivery schedule.

2. A method according to claim 1, wherein receiving from the media terminal an indication of media items comprises receiving a total amount of media items of the same type.

3. A method according to claim 2, wherein the media items comprise currency and the same type comprises a denomination of that currency.

4. A method according to claim 1, wherein the condition criterion comprises the media item having a satisfactory condition.

5. A method according to claim 4, wherein the satisfactory condition comprises the media item having at least a defined minimum physical condition.

6. A method according to claim 4, wherein the condition criterion comprises the media item having an unsatisfactory condition.

7. A method according to claim 6, wherein the unsatisfactory condition comprises the media item not having at least a defined minimum physical condition.

8. A method according to claim 1, wherein adjusting the calculated amount of media required based on the indication of media items that fulfill the condition criterion comprises subtracting the indication of media items from the calculated amount of media where the media items have a satisfactory condition.

9. A method according to claim 1, wherein the providing the executable instruction to the hardware processor further causes the hardware processor to perform additional operations comprising:

receiving an indication of the undispensed media remaining in the media terminal; and deducting the indication of undispensed media remaining in the media terminal from the calculated amount of media required.

\* \* \* \* \*